United States Patent
Nagasawa et al.

(10) Patent No.: US 10,137,808 B2
(45) Date of Patent: Nov. 27, 2018

(54) RECESSED SEAM STRUCTURE FOR COVER

(71) Applicants: HONDA MOTOR CO., LTD., Tokyo (JP); TACHI-S CO., LTD., Tokyo (JP)

(72) Inventors: Taku Nagasawa, Wako (JP); Tomoyuki Uemura, Wako (JP); Kazuyuki Kaneko, Wako (JP); Takahiko Nagasawa, Tokyo (JP); Tsutomu Fujikake, Tokyo (JP); Ryo Kurobe, Tokyo (JP)

(73) Assignees: HONDA MOTOR CO., LTD., Tokyo (JP); TACHI-S CO., LTD., Tokyo (JP)

(*) Notice: Subject to any disclaimer, the term of this patent is extended or adjusted under 35 U.S.C. 154(b) by 0 days.

(21) Appl. No.: 15/513,503

(22) PCT Filed: Aug. 21, 2015

(86) PCT No.: PCT/JP2015/073480
§ 371 (c)(1),
(2) Date: Mar. 22, 2017

(87) PCT Pub. No.: WO2016/047324
PCT Pub. Date: Mar. 31, 2016

(65) Prior Publication Data
US 2017/0305315 A1  Oct. 26, 2017

(30) Foreign Application Priority Data

Sep. 25, 2014 (JP) ................................. 2014-194666

(51) Int. Cl.
*B60N 2/58* (2006.01)
*A47C 31/02* (2006.01)
(Continued)

(52) U.S. Cl.
CPC .............. *B60N 2/585* (2013.01); *A47C 31/02* (2013.01); *B60N 2/60* (2013.01); *B68G 7/052* (2013.01); *A47C 31/11* (2013.01)

(58) Field of Classification Search
CPC . B60N 2/585; B60N 2/60; B60N 2/58; B60N 2/5816; B60N 2/5825; B60N 2/6018; B60N 2/6027; B60N 2/6054; A47C 31/11
(Continued)

(56) References Cited

U.S. PATENT DOCUMENTS 6,206,467 B1 * 3/2001 Mense ...................... B60N 2/58
                                                             297/218.2
6,964,453 B1 * 11/2005 Flegal .................. B60N 2/5825
                                                             297/452.6
(Continued)

FOREIGN PATENT DOCUMENTS

JP       8-24450 A     1/1996
JP       3134694 B2    2/2001
(Continued)

OTHER PUBLICATIONS

Machine Translation of JP 2003-024187 (Year: 2018).*
(Continued)

*Primary Examiner* — Mark R Wendell
(74) *Attorney, Agent, or Firm* — Birch, Stewart, Kolasch & Birch, LLP

(57) ABSTRACT

A recessed seam structure for a cover (3) that improves workability when forming a recessed seam (A) and allows frequent attachment and detachment at the recessed seam (A) is provided. In a seat (1) having the recessed seam (A) formed by pulling part of the cover (3) toward a side of a cushion material (2), the recessed seam (A) is provided with an opening and closing fastener (30) configured to couple the cover (3) and the cushion material (2), and the opening
(Continued)

and closing fastener (30) includes a first fastener half (31) fixed to a back face of the cover (3) and a second fastener half (32) fixed to the cushion material (2). In such a seat (1), the recessed seam (A) can be formed easily and reliably on the seat (1) by aligning an end of the first fastener half (31) in a longitudinal direction and an end of the second fastener half (32) in the longitudinal direction of the opening and closing fastener (30) and simply sliding a slider (33).

7 Claims, 3 Drawing Sheets

(51) Int. Cl.
  *B68G 7/052* (2006.01)
  *B60N 2/60* (2006.01)
  *A47C 31/11* (2006.01)
(58) Field of Classification Search
  USPC .................................................. 297/228.13
  See application file for complete search history.

(56) References Cited

U.S. PATENT DOCUMENTS

| | | | | |
|---|---|---|---|---|
| 2006/0214485 | A1* | 9/2006 | Brockschnieder | B60N 2/449 297/228.11 |
| 2006/0237986 | A1* | 10/2006 | Brockschnieder | B60N 2/5825 296/65.09 |
| 2007/0011853 | A1* | 1/2007 | Smith | B60N 2/5825 24/545 |
| 2009/0033131 | A1* | 2/2009 | Clauser | B60N 2/5825 297/218.4 |
| 2009/0064471 | A1* | 3/2009 | Santin | A47C 31/023 24/581.11 |
| 2009/0152909 | A1* | 6/2009 | Andersson | B60N 2/5642 297/180.13 |
| 2015/0130255 | A1* | 5/2015 | Kheil | B60N 2/5825 297/452.58 |
| 2015/0307000 | A1* | 10/2015 | Kozaki | B60N 2/58 280/730.2 |
| 2017/0008436 | A1* | 1/2017 | Wyatt | B60N 2/5825 |
| 2017/0327017 | A1* | 11/2017 | Nagasawa | B60N 2/60 |

FOREIGN PATENT DOCUMENTS

| | | | | |
|---|---|---|---|---|
| JP | 2003-024187 | * | 1/2003 | |
| JP | 2003-24187 A | | 1/2003 | |
| JP | 3779028 B2 | | 5/2006 | |
| JP | WO2008050393 | * | 2/2008 | ............ B68G 7/052 |

OTHER PUBLICATIONS

International Search Report, issued in PCT/JP2015/073480, dated Nov. 17, 2015.

Japanese Notice of Reasons for Rejection dated Dec. 12, 2017 for corresponding Japanese Application No. 2014-194666, with an English translation.

* cited by examiner

[FIG.1]
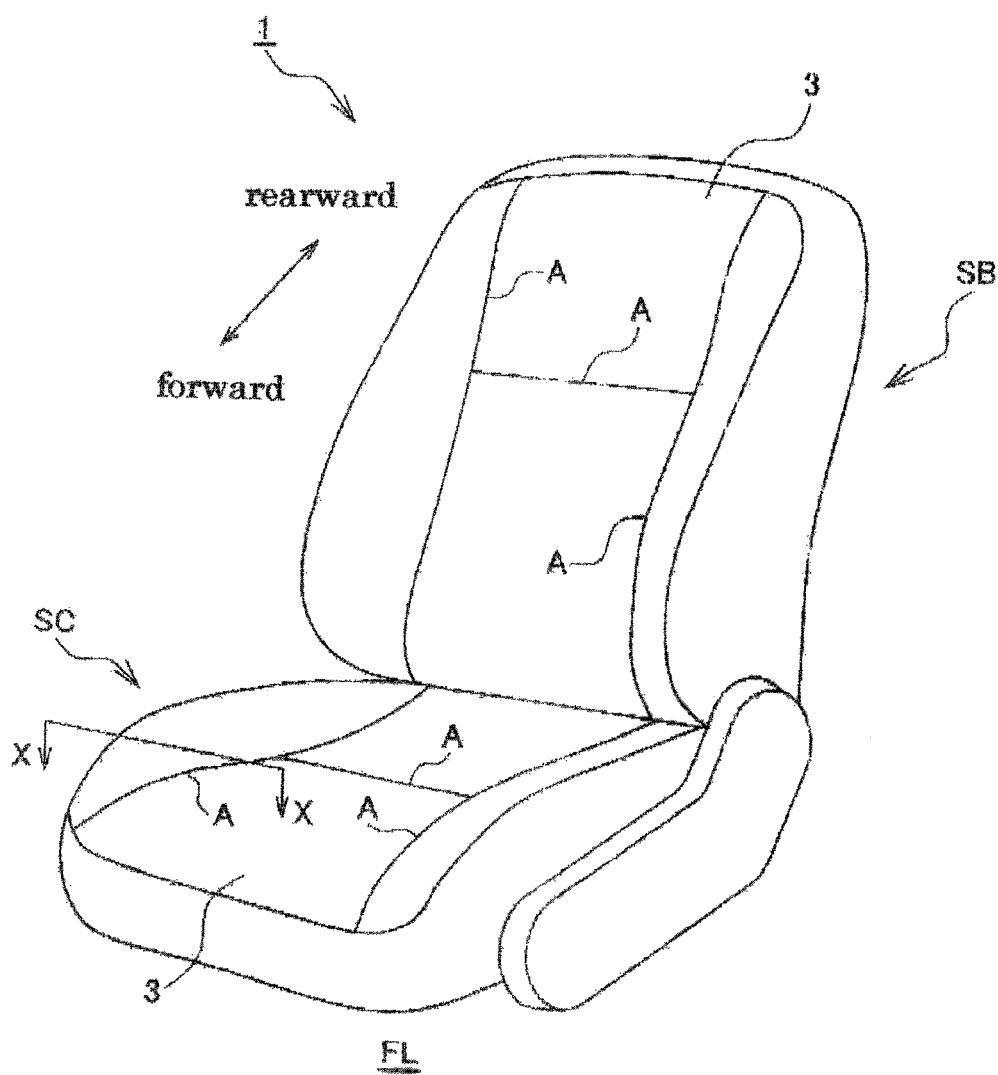

[FIG.2]
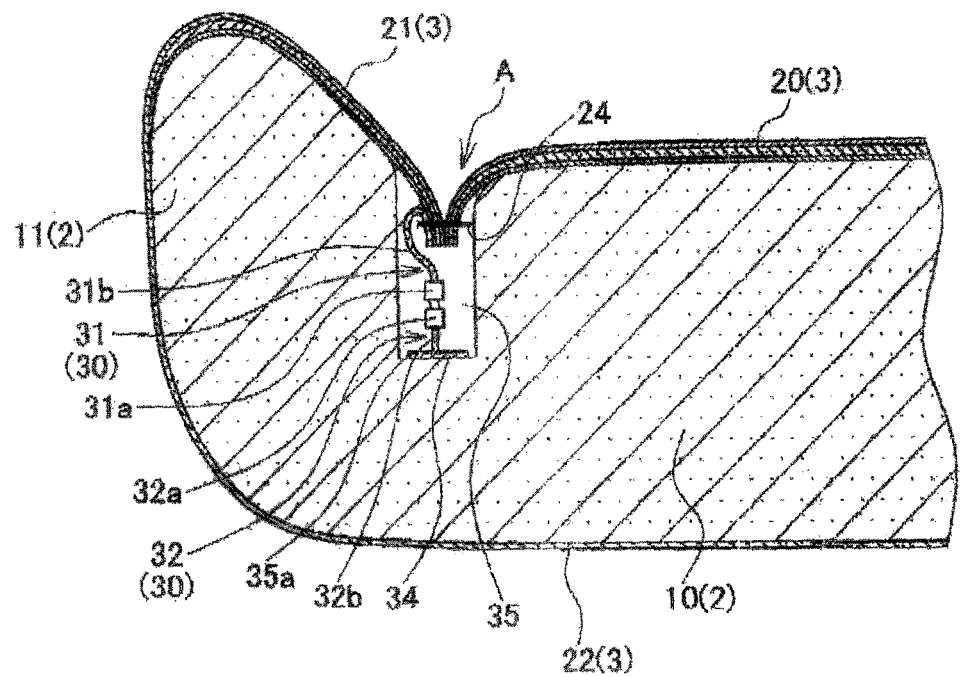
[FIG.3]
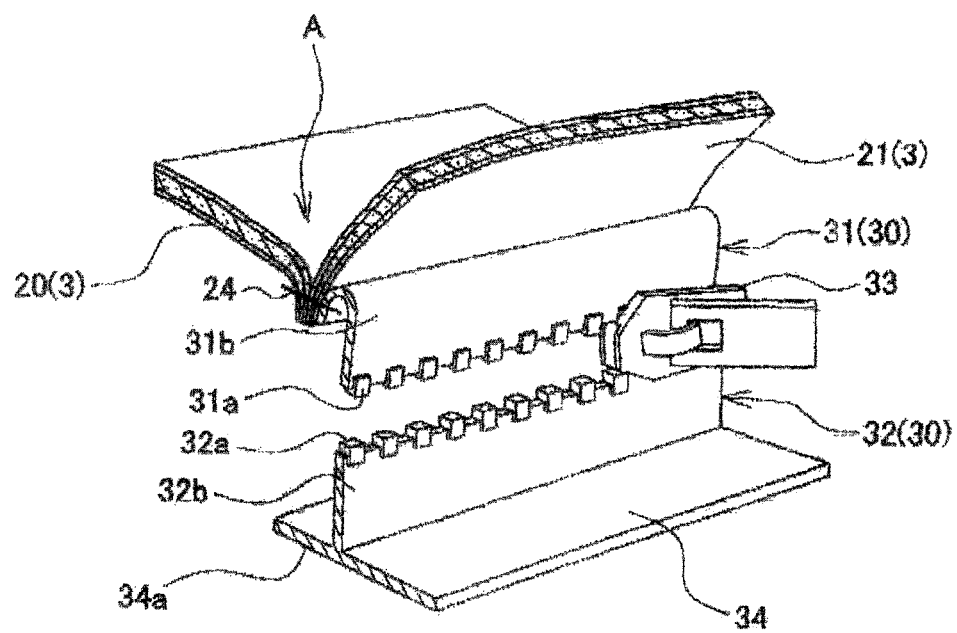

[FIG.4]
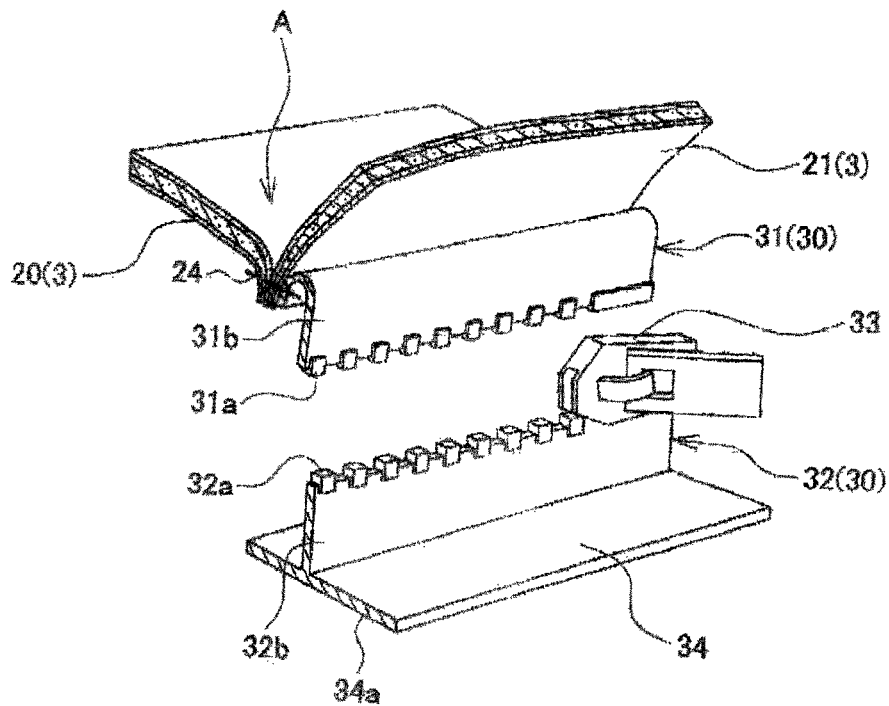
[FIG.5]
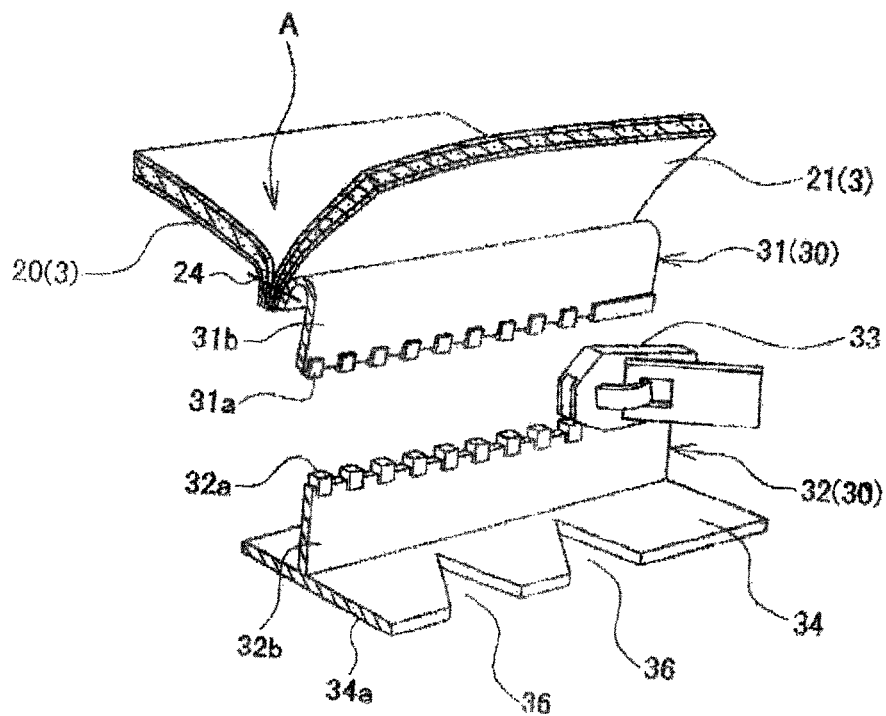

RECESSED SEAM STRUCTURE FOR COVER

BACKGROUND ART

The present invention relates to a seat provided with recessed seams for a cover.

BACKGROUND ART

In the related art, a technology of the field described above is disclosed in Japanese Patent No. 3134694. In the seat disclosed in this publication, recessed seams extending in a fore-and-aft direction are provided at boundaries between a major seating surface and side surfaces disposed on both sides thereof. The recessed seam is formed by pulling part of the cover inward of the seat by passing a wire provided on a cushion side through a loop portion provided on the cover side. However, this configuration has a problem that operation for passing the wire through the loop portion is troublesome. Accordingly, with a seat disclosed in Japanese Patent No. 3779028, a hook and loop fastener half is joined to the cover side by sewing at the recessed seam, and a hook and loop fastener half is fixed to a cushion material side by adhesion. When attaching the cover to the cushion material, the hook and loop fastener half on the cover side is pressed against the other hook and loop fastener half on the cushion material from above. With this operation, the recessed seam may be formed on the seat easily.

CITATION LIST

Patent Literature

PTL1: Japanese Patent No. 3134694
PTL2: Japanese Patent No. 3779028

SUMMARY

Technical Problem

However, with the seat of the related art described above, when the hook and loop fastener half on the cover side is pressed against the hook and loop fastener half on the cushion material side in a careless way, the recessed seams may be subjected to bending or distortion. Therefore, operation of pressing downward needs to be performed while aligning the one hook and loop fastener half accurately with the other hook and loop fastener half, which does not provide good workability. In addition, when the one hook and loop fastener half is frequently attached and detached with respect to the other hook and loop fastener half, there arises a problem that joining properties between the hook and loop fastener halves are deteriorated and fastening performance is deteriorated correspondingly, which eventually result in easy separation between the hook and loop fastener halves.

It is an object of the present invention to provide a recessed seam structure for a cover that improves workability when forming a seamed portion and allows frequent attachment and detachment at the recessed seam.

Solution to Problem

The present invention provides a seat including a recessed seam formed by pulling part of a cover toward a side of a cushion material side, wherein the recessed seam includes an opening-and-closing fastener configured to couple the cover and the cushion material, the opening-and-closing fastener includes a first fastener half fixed to a back face of the cover, and a second fastener half fixed to the cushion material.

In the seat, the recessed seam can be formed easily and reliably by aligning an end of one fastener half in the longitudinal direction and an end of the other fastener half in the longitudinal direction of the opening-and-closing fastener and simply sliding a slider. Since the fastener half on the cover side may be removed easily from the fastener half on the cushion material side simply by sliding the slider, positional displacement of the recessed seam may hardly occur even when the cover is frequently changed.

In addition, a tape-shaped base material of the second fastener half is preferably attached to the base portion which is to be fixed to the cushion material. In this manner, by employing the base portion, the fastener half may be fixed easily to the cushion material by using an adhesive material and a double-faced adhesive tape.

The cushion material is preferably provided with a depressed portion extending along the recessed seam, and the base portion is preferably fixed to the bottom surface of the depressed portion by adhesion. When such a configuration is employed, the opening-and-closing fastener is adequately prevented from touching the buttocks of a passenger at the recessed seam.

Advantageous Effects of Invention

According to the present invention, workability may be improved when forming a recessed seam, and frequent attachment and detachment at the recessed seam is enabled.

BRIEF DESCRIPTION OF DRAWINGS

FIG. 1 is a perspective view of an embodiment of a seat in which a recessed seam structure for a cover according to the present invention is used.

FIG. 2 is a cross-sectional view taken along the line X-X in FIG. 1.

FIG. 3 is an enlarged perspective view of a principal portion illustrating an opening-and-closing fastener that is applied to the seat of the present invention.

FIG. 4 is a perspective view illustrating an opened state of the fastener.

FIG. 5 is a perspective view which is the same as FIG. 4 illustrating other example.

DESCRIPTION OF EMBODIMENTS

A preferred embodiment of a seat in which a recessed seam structure for a cover according to the present invention will be described in details below with reference to the drawings.

As illustrated in FIG. 1, a vehicle seat 1 is provided with a seat cushion SC which is movable forward and backward on a floor panel FL, and a seat back SB reclinable with respect to the seat cushion SC. The seat cushion SC and the seat back SB are configured in such a manner that a surface of a cushion material 2 made of foam is covered with a cover 3.

In the seat 1, the seat cushion SC and the seat back SB are each provided with linear recessed seams A. The recessed seams A form an appearance of the seat 1 and, simultaneously, prevents the cover 3 from being slacked or displaced.

Here, the recessed seam A of the seat cushion SC will be described as an example. As illustrated in FIG. 2, the cushion material 2 of the seat cushion SC includes a main cushion portion 10 for supporting the buttocks of a passenger from below, and a side cushion portion 11 for supporting the buttocks of the passenger from the side.

In contrast, the cover 3 includes a seat portion 20 to be placed on the main cushion portion 10 of the cushion material 2, a side surface portion 21 to be placed on the side cushion portion 11, and a back face portion 22 that extends continuously from the side surface portion 21 and extends around to the back side of the cushion material 2. The seat portion 20 and the side surface portion 21 of the cover 3 are joined by a joint portion 24.

As illustrated in FIG. 2 to FIG. 4, the recessed seams A are provided with an opening and closing fastener 30 for joining the cover 3 and the cushion material 2. The opening and closing fastener 30 includes a first fastener half 31 fixed to the back face of the cover 3 by sewing, a second fastener half 32 fixed to the cushion material 2 by an adhesive agent, and a slider 33 for joining the first fastener half 31 and the second fastener half 32.

The first fastener half 31 has a configuration in which teeth 31a referred to as elements are disposed in a line on a tape-shaped base material 31b and, similarly, the second fastener half 32 also has a configuration in which teeth 32a referred to as elements are disposed in a line on a tape-shaped base material 32b. The base materials 31b, 32b may be resin or cloth.

A proximal end of the base material 31b of the first fastener half 31 extends along the recessed seams A, and is fixed to a joint position between the seat portion 20 and the side surface portion 21 of the cover 3 by sewing. In contrast, a proximal end of the base material 32b of the second fastener half 32 is provided integrally with a resin base portion 34 formed of an elongated flat plate. The proximal end of the base material 32b is integrated at a center portion of the base portion 34. When the base material 32b is formed of resin, the base material 32b may be provided so as to extend upright at the center of the base portion 34.

In addition, the cushion material 2 is provided with a depressed portion 35 that extends along the recessed seam A. A bottom surface 34a of the base portion 34 is fixed to a bottom surface 35a of the depressed portion 35 by an adhesive agent or a double-faced adhesive tape. By employing the base port ion 34 as described above, the second fastener half 32 may be fixed easily and reliably to the cushion material 2 by using the adhesive material and the double-faced adhesive tape.

Here, although the bottom surface 34a of the base portion 34 is fixed to the bottom surface 35a of the depressed portion 35 formed on the cushion material 2 by the adhesive material or the double-faced adhesive tape, the invention is not limited thereto. For example, when forming the cushion material with urethane foaming, the base portion may be insert-molded to be formed integrally with the cushion material in a foam molding step. A base portion may be fixed to a wire in the cushion material with a C ring. Furthermore, the base portion may be fixed by being joined to an inner cover that is adhered to the bottom surface 35a of the depressed portion 35 formed on the cushion material by sewing.

Since the opening and closing fastener 30 is stored in the depressed portion 35, the opening and closing fastener 30 is adequately prevented from touching the buttocks of a passenger at a portion where the recessed seam A is provided.

In the seat 1 of this configuration, the recessed seam A can be formed easily and reliably on the seat 1 by aligning an end of the first fastener half 31 in the longitudinal direction and an end of the second fastener half 32 in the longitudinal direction of the opening and closing fastener 30 and simply sliding the slider 33. Therefore, good workability is achieved when forming the recessed seam A. In addition, since the first fastener half 31 on the cover 3 side may be detached easily from the second fastener half 32 on the cushion material 2 side (see FIG. 4) simply by sliding the slider 33, positional displacement of the recessed seam A may hardly occur even when the cover 3 is frequently changed. Changing of the cover 3 in this manner is performed when changing the material of the cover depending on seasons or when the cover 3 needs to be cleaned because it gets dirty.

FIG. 5 shows another example, which is almost the similar configuration to the example given above. Therefore, only a different point will be described and description of other points will be omitted. The different point is that an incised portion 36 is formed on the base portion 34. The reason is that when the recessed seam is curved, the base portion 34 can be easily fixed to the bottom surface 35a of the depressed portion 35 formed on the cushion material 2, so that workability in fixing the base portion 34 is improved.

Although the incised portion 36 is provided on a front side of the second fastener half 32 in the drawing, the incised portion 36 may be provided on a rear side at the same position as the front side, or alternatively, may be provided on either side.

REFERENCE SIGNS LIST 1 seat
2 cushion material
30 opening-and-closing fastener
31 first fastener half
31a tooth
31b base material
32 second fastener half
32a tooth
32b base material
33 slider
34 base portion
35 depressed portion
35a bottom surface
SB seat back
SC seat cushion
A recessed seam

The invention claimed is:

1. A seat having a recessed seam, comprising:
a cushion material;
a cover element covering the cushion material, the cover element including an outer surface and an inner surface, the cover element being attached to the cushion material;
a recessed seam defined in the cover element such that a predetermined portion of the cover element is recessed inwardly into the cushion material;
a mating fastener provided between the cover element and the cushion material at a location corresponding to the recessed seam, the mating fastener being configured to permit repeated coupling of the cover element and the cushion material, the mating fastener comprising:
a first fastener including a first engagement element, the first fastener being fixed to the inner surface of the cover element along the recessed seam;
a second fastener including a second engagement element, the second fastener having a base portion fixedly provided in the cushion material;

the first and second engagement elements being positioned in the cushion material to permit mutual engagement for placing the first fastener and second fastener in a joined condition between the cover element and the cushion material to thereby couple the cover element and the cushion material, and permit disengagement thereof from each other for placing the first fastener and second fastener in a separated condition between the cover element and the cushion material to thereby allow the cover element to be released from the cushion material; and a slider configured to cause the mutual engagement and disengagement of the first engagement element and second engagement element, the slide being slidingly movable along the first and second engagement elements, wherein the base portion of the second fastener is formed of an elongated planar material to provide an elongated planar base portion in the second fastener, wherein the second fastener further includes an elongated rectangular base material having a first end provided with the second engagement element and a second end opposite to the first end, wherein the elongated planar base portion of the second fastener is integrally fixed to the second end of the elongated rectangular base material to extend in a transverse direction of the elongated rectangular base material, and wherein the elongated planar base portion is fixed to the cushion material in a direction along the recessed seam.

2. The seat having a recessed seam according to claim 1, wherein the elongated planar base portion includes one or more incised portions formed therewith.

3. The seat having a recessed seam according to claim 1, wherein the first engagement element comprises first engagement teeth, wherein the second engagement element comprises second engagement teeth, wherein the first and second engagement teeth are configured and arranged to permit mutual engagement thereof for placing the first fastener and second fastener in the joined condition between the cover element and the cushion material, and also permit disengagement thereof from each other for placing the first fastener and second fastener in the separated condition between the cover element and the cushion material, wherein the slider is configured to cause the mutual engagement and disengagement of the first and second engagement teeth, the slider being operatively connected with the first and second engagement teeth so as to be slidingly movable therealong in the cushion material, such that the mutual engagement of the first and second engagement teeth by normal operation of the slider in the cushion material results in coupling the cover element and the cushion material at and along the recessed seam, thereby retaining the recessed seam in the seat, with the slider positioned in the cushion material, wherein the disengagement of the first and second engagement teeth by reverse operation of the slider positioned in the cushion material allows the cover element to be released from the cushion material at and along the recessed seam, and wherein the second engagement teeth are provided to the first end of the elongated rectangular base material.

4. The seat having a recessed seam according to claim 3, wherein the elongated planar base portion includes one or more incised portions formed therewith.

5. The seat having a recessed seam according to claim 1, wherein the first engagement element comprises first engagement teeth, wherein the second engagement element comprises second engagement teeth, wherein the first and second engagement teeth are configured and arranged to permit mutual engagement thereof for placing the first fastener and second fastener in the joined condition between the cover element and the cushion material to thereby couple the cover element and the cushion material, and also permit disengagement thereof from each other for placing the first fastener and second fastener in the separated condition between the cover element and the cushion material to thereby allow the cover element to be released from the cushion material, wherein the cushion material includes a depressed portion formed therein, the depressed portion extending in a direction along the recessed seam, wherein the first and second engagement teeth and the slider are positioned in the depressed portion, wherein the slider is configured to cause the mutual engagement and disengagement of the first and second engagement teeth, the slider being operatively connected with the first and second engagement teeth so as to be slidingly movable therealong in the depressed portion, such that the mutual engagement of the first and second engagement teeth by normal operation of the slider in the depressed portion results in coupling the cover element and the cushion material at and along the recessed seam, thereby retaining the recessed seam in the seat, with the slider positioned in the depressed portion, wherein the disengagement of the first and second engagement teeth by reverse operation of the slider positioned in the depressed portion allows the cover element to be released from the cushion material at and along the recessed seam, wherein the second engagement teeth are provided to the first end of the elongated rectangular base material, and wherein the elongated planar base portion of the second fastener is fixed to the bottom of the depressed portion in a direction along the recessed seam.

6. The seat a having a recessed seam according to claim 5, wherein the elongated planar base portion includes one or more incised portions formed therewith.

7. The seat a having a recessed seam according to claim 1, wherein the cushion material includes a depressed portion formed therein, the depressed portion extending in a direction along the recessed seam, wherein the first and second engagement elements and the slider are positioned in the depressed portion, wherein the elongated planar base portion is fixed to a bottom surface of the depressed portion, wherein the first engagement element comprises first engagement teeth, wherein the second engagement element comprises second engagement teeth, wherein the base portion of the second fastener includes a first region facing the first engagement teeth and a second region opposite to the first region, wherein the second engagement teeth are provided at the first region of the base portion, wherein the second region of the base portion is fixedly provided in the cushion material,
wherein the base portion of the second fastener includes:
   a first region facing the first engagement teeth; and
   a second region opposite to the first region,
wherein the second engagement teeth are provided to the first region of the base portion,
wherein the second region of the base portion is fixedly provided in the cushion material,
wherein the second region of the base portion of the second fastener is fixed to a bottom surface of the depressed portion,
wherein the slider is configured to cause the mutual engagement and disengagement of the first and second engagement teeth, the slider being operatively connected with the first and second engagement teeth so as to be slidingly movable therealong in the depressed portion, such that the mutual engagement of the first and second engagement teeth by the slider in the depressed portion results in coupling the cover element and the cushion material at and along the recessed seam, thereby retaining the recessed seam in the seat, with the slider positioned in the depressed portion, and
wherein the disengagement of the first and second engagement teeth by the reverse operation of the slider positioned in the depressed portion allows the cover element to be released from the cushion material at and along the recessed seam.

* * * * *